A. NELSON.
NON-SKID ATTACHMENT FOR VEHICLE WHEELS.
APPLICATION FILED SEPT. 13, 1919.

1,389,969.

Patented Sept. 6, 1921.

Witnesses
Emil E Hallenberg
H Reinshagen

INVENTOR
A. Nelson
BY H.J. Sanders
Atty.

UNITED STATES PATENT OFFICE.

ANDREW NELSON, OF CHATTANOOGA, TENNESSEE.

NON-SKID ATTACHMENT FOR VEHICLE-WHEELS.

1,389,969.  Specification of Letters Patent.  Patented Sept. 6, 1921.

Application filed September 13, 1919. Serial No. 323,580.

*To all whom it may concern:*

Be it known that I, ANDREW NELSON, a citizen of Sweden, residing at Chattanooga, in the county of Hamilton and State of Tennessee, have invented certain new and useful Improvements in Non-Skid Attachments for Vehicle-Wheels, of which the following is a specification.

This invention relates to improvements in non-skid attachments for vehicle wheels and more particularly to that class of non-skid attachments adapted primarily for use on automobiles. With the foregoing and other objects in view the invention consists in the combination and arrangement of parts to be hereinafter fully described, pointed out in the appended claims and illustrated in the accompanying drawings which form a part of this specification and in which—

Like reference characters denote corresponding parts in both views.

Figure 1:
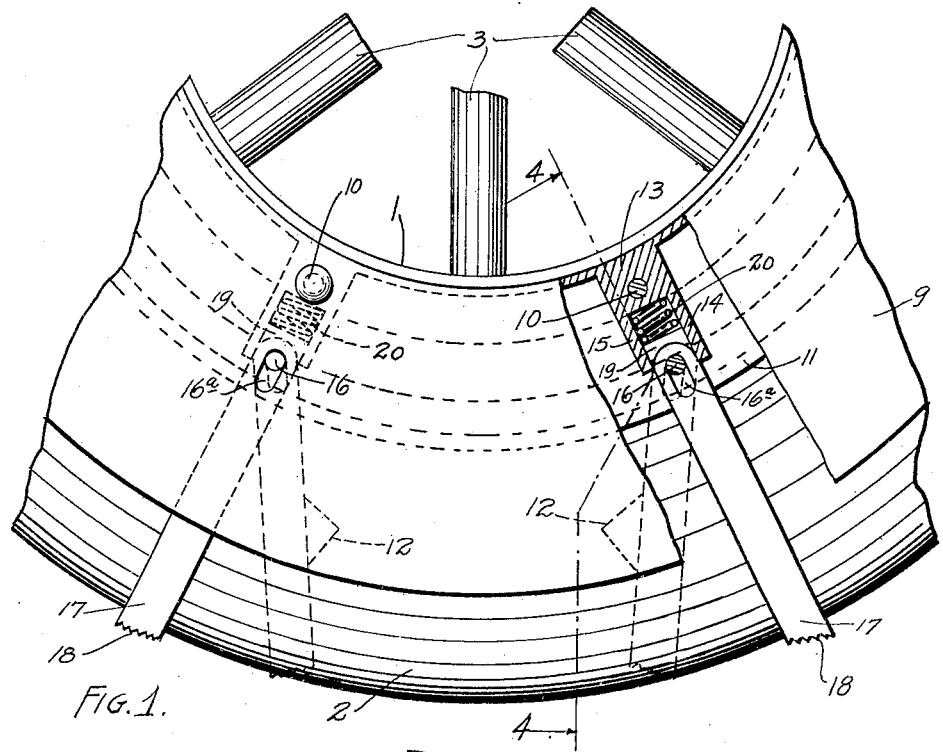
Figure 1 is a fragmentary plan view of a vehicle wheel illustrating the application of my device.
Figure 2:
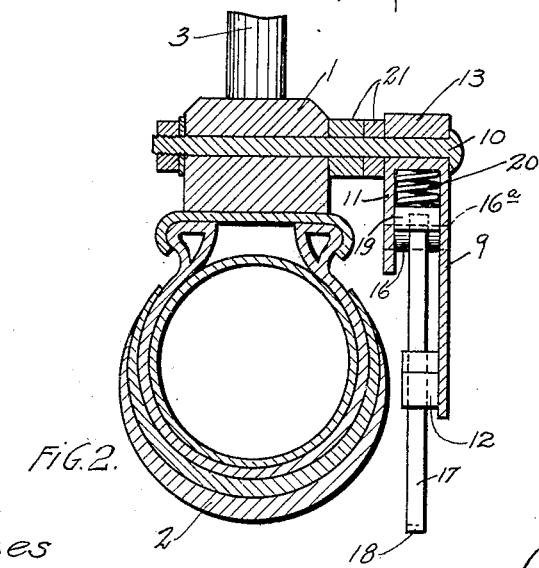
Fig. 2 is a cross section taken on line 4—4 of Fig. 1.

The reference numeral 1 denotes the felly, 2 the tire and 3 the spokes of a vehicle wheel. To the felly 1 I secure a shield by means of the bolts 10, said shield being an inverted substantially trough-shaped member comprising the spaced sides 9, 11, the side 9 being longer than the side 11. The sides of the shield lie parallel to the wheel, the side 9 extending alongside the tire and being provided upon its face adjacent the tire with the stop lug 12.

Between the spokes and the trough of the shield I form a plurality of hollow-ended projections each of which comprises a solid base 13 through which the bolts 10 extend, a long wall 14 and a short wall 15, the long walls of the successive projections being disposed alternately adjacent and remote from each other. At the mouth of each projection a pin 16 extends transversely through the shield and is disposed in elongated shield-slots 16ª and pivotally carries a tooth 17 which depends beyond the shield face 9 and terminates in the serrated edge 18. The teeth 17 are adapted for engagement with the stop lugs 12. A straddle block 19 inside each projection 14, 15 sits upon a tooth 17 and is spaced away from the base end of the projection by the expansion spring 20 whereby each tooth 17 is projected outwardly from the member 14, 15 so that its free edge lightly grips the road intermittently as the wheel rotates. In making a turn the vehicle is prevented from skidding as the teeth 17 will grip the road should the wheels start to slide laterally. The long wall 14 of each projection serves as a shoulder to brace the pivoted end of the tooth 17 and to permit it to swing in one direction only. The construction of the successive projections is such that the successive teeth 17 can swing only in opposite directions. Split washers 21 permit adjustment of the shield to suit the size of the tire.

What is claimed is—

1. As an attachment for vehicle wheels, an inverted trough-shaped shield, one of the sides of said shield being longer than the other one, means for securing said shield fast and parallel to the wheel, stop lugs carried by one of the sides of said shield, projections arranged in said shield, and teeth pivotally and adjustably suspended from said projections and in one position projecting beyond the tread of the wheel tires, said teeth being adapted for engagement with the said stop lugs.

2. As an attachment for vehicles wheels, an inverted trough-shaped shield, one of the sides of said shield being longer than the other one, stop lugs carried by the longer side of said shield, means for securing said shield fast and parallel to the wheel, projections arranged in said shield, said projections having bifurcated ends, and teeth pivotally and adjustably suspended from the bifurcated ends of said projections and in one position projecting beyond the tread of the wheel tires, said teeth being adapted for engagement with the stop lugs.

3. As an attachment for vehicle wheels, an inverted trough-shaped shield, one of the sides of said shield being longer than the other, stop lugs carried by the longer side of said shield, means for securing said shield fast and parallel to the wheel, projections arranged in said shield between the wheel spokes, said projections having bifurcated ends and one of the walls thereof being relatively long, the long walls of successive projections being disposed alternately adjacent and remote from each other, and teeth pivotally and adjustably suspended from the bifurcated ends of said projections and in one position projecting beyond the tread of the wheel tires, said teeth being adapted for engagement with the stop lugs and with the relatively long walls of the projections.

4. As an attachment for vehicle wheels, an inverted trough-shaped shield, means for securing said shield fast and parallel to the wheel, projections arranged in said shield, and teeth pivotally and adjustably suspended from said projections and in one position projecting beyond the tread of the wheel tires.

In testimony that I claim the foregoing as my own I have hereto affixed my signature in the presence of two subscribing witnesses.

ANDREW NELSON.

Witnesses:
T. D. FLETCHER,
J. W. GILLESPIE.